United States Patent
Sen et al.

(10) Patent No.: US 12,283,385 B1
(45) Date of Patent: Apr. 22, 2025

(54) ADVANCED COMPOSITES AND COATINGS FOR RADIATION ENVIRONMENT SHIELDING

(71) Applicant: GeoPlasma, LLC, Huntsville, AL (US)

(72) Inventors: Subhayu Sen, Madison, AL (US); J. Scott O'Dell, Arab, AL (US)

(73) Assignee: GeoPlasma, LLC, Huntsville, AL (US)

( * ) Notice: Subject to any disclaimer, the term of this patent is extended or adjusted under 35 U.S.C. 154(b) by 773 days.

(21) Appl. No.: 17/462,301

(22) Filed: Aug. 31, 2021

Related U.S. Application Data

(60) Provisional application No. 63/072,979, filed on Sep. 1, 2020.

(51) Int. Cl.
*G21F 1/12* (2006.01)
*B32B 7/12* (2006.01)
(Continued)

(52) U.S. Cl.
CPC .................. *G21F 1/12* (2013.01); *B32B 7/12* (2013.01); *B32B 27/12* (2013.01); *B32B 27/32* (2013.01);
(Continued)

(58) Field of Classification Search
CPC .. G21F 1/12; B32B 7/12; B32B 27/12; B32B 27/32; B32B 2255/02; B32B 2255/20;
(Continued)

(56) References Cited

U.S. PATENT DOCUMENTS

| 4,215,161 A | 7/1980 | Seibold et al. |
|---|---|---|
| 4,218,622 A | 8/1980 | McMurtry et al. |

(Continued)

FOREIGN PATENT DOCUMENTS

| WO | WO-9636972 A1 | 11/1996 |
|---|---|---|
| WO | WO-9859344 A1 | 12/1998 |

OTHER PUBLICATIONS

Lu, et al ("Structure and properties of UHMWPE fiber/carbon fiber hybrid composites," J. App. Polymer Sci., vol. 101, No. 3, pp. 1880-1884, Aug. 2006). (Year: 2006).*

(Continued)

*Primary Examiner* — Michael Maskell
(74) *Attorney, Agent, or Firm* — Advanced Technology Law; Luke Anderson

(57) ABSTRACT

Radiation shielding performs a range of functions determined by the type and number of layers of materials used, thickness, weight, and structural support afforded by the radiation shielding. A radiation shield laminate stack may be constructed consisting of a plurality of layers of ultra-high molecular weight (UHMW) polyethylene, polyethylene film, and carbon fiber, which is held together with an epoxy. The carbon fiber lay may be coated with nanoparticles of Boron (B) or Boron Nitride (BN), Boron Oxide ($B_2O_3$) or Boron Carbide ($B_4C$) or a combination thereof to increase the shielding properties of the laminate stack. The radiation shield is lighter than aluminum, structurally sound, and thus may be used in the space environment to effectively block Galactic Cosmic Rays, atomic oxygen and UV radiation.

18 Claims, 11 Drawing Sheets

(51) Int. Cl.
  *B32B 27/12* (2006.01)
  *B32B 27/32* (2006.01)
  *B64G 1/54* (2006.01)

(52) U.S. Cl.
  CPC ....... *B32B 2255/02* (2013.01); *B32B 2255/20* (2013.01); *B32B 2262/106* (2013.01); *B32B 2571/00* (2013.01); *B64G 1/543* (2013.01)

(58) Field of Classification Search
  CPC .......... B32B 2262/106; B32B 2571/00; B64G 1/543
  USPC ..................... 250/505.1, 515.1, 516.1, 519.1
  See application file for complete search history.

(56) References Cited

U.S. PATENT DOCUMENTS

| | | | |
|---|---|---|---|
| 4,252,691 A | | 2/1981 | Lipp et al. |
| 4,293,598 A | | 10/1981 | Hortman et al. |
| 5,021,367 A | * | 6/1991 | Singh ................ C04B 35/62871 428/389 |
| 5,436,948 A | | 7/1995 | Okada et al. |
| 6,265,466 B1 | | 7/2001 | Glatkowski et al. |
| 7,160,486 B2 | | 1/2007 | Valiere |
| 7,250,119 B2 | | 7/2007 | Sayala |
| 7,295,646 B1 | | 11/2007 | Wilbuer et al. |
| 7,855,157 B1 | | 12/2010 | Kaul et al. |
| 8,318,045 B2 | | 11/2012 | Kim et al. |
| 9,067,385 B2 | | 6/2015 | Kang et al. |
| 9,114,576 B2 | | 8/2015 | Bolick et al. |
| 11,621,096 B2 | * | 4/2023 | Yifat ....................... G21F 1/085 250/515.1 |
| 2004/0254419 A1 | | 12/2004 | Wang |
| 2006/0040182 A1 | | 2/2006 | Kawakami et al. |
| 2009/0114857 A1 | * | 5/2009 | DeMeo ..................... G21F 1/00 250/516.1 |
| 2010/0219383 A1 | | 9/2010 | Eklund |
| 2013/0119316 A1 | | 5/2013 | Sauti et al. |
| 2014/0225039 A1 | | 8/2014 | Chiang et al. |
| 2019/0092910 A1 | | 3/2019 | Robison et al. |
| 2019/0182996 A1 | | 6/2019 | Kelkar et al. |

OTHER PUBLICATIONS

Lu, et al (âStructure and properties of UHMWPE fiber/carbon fiber hybrid composites, â J. App. Polymer Sci., vol. 101, No. 3, pp. 1880-1884, Aug. 2006). (Year: 2006) (Year: 2006).*

Non-final Office Action from co-pending U.S. Appl. No. 17/462,601 issued on Aug. 1, 2023.

Applicant's Amendment and Response to the Non-final Office Action Dated Aug. 1, 2023 in co-pending U.S. Appl. No. 17/462,601, filed Jan. 30, 2024.

Notice of Allowance from co-pending U.S. Appl. No. 17/462,601 issued on Mar. 27, 2024.

Lin, Jinwen, and Zafar Iqbal. "Facile synthesis of pure boron nanotubes and nanofibers." MRS Online Proceedings Library (OPL) 1307 (Mar. 28, 2011): mrsf10-1307. (Year: 2011).

Patel, Rajen B. "Synthesis and characterization of novel boron-based nanosructures and composites." New Jersey Institute of Technology, May 31, 2013. (Year: 2013).

Chkhartishvili, L. "Boron-Containing Nanostructured Materials for Neutron-Shields." Nanostructured Materials for the Detection of CBRN. Springer Netherlands, Jul. 12, 2018. (Year: 2018).

Hu, Guang, et al. "Lightweight and heat resistant resin-based composite neutron shielding material." AIP Advances 9.7 (Jul. 29, 2019), (Year: 2019).

Sen, Hayri, and Tamer Ozben. "Mechanical Properties of Boron Reinforced Textile Composite." Agbiol 2021 (Sep. 1, 2021): 337. (Year: 2021).

The Development of a Multifunctional Composite Material for Use in Human Space Exploration Beyond Low-Earth Orbit, by S. Sen, E. Schofield, J.S. O'Dell, L. Deka, and S. Pillay, Journal of The Minerals, Metals & Materials Society, vol. 61, No. 1, Jan. 2009.

* cited by examiner

ADVANCED COMPOSITES AND COATINGS FOR RADIATION ENVIRONMENT SHIELDING

PRIORITY CLAIM

This application claims priority to U.S. Provisional Application No. 63/072,979 filed on Sep. 1, 2020, which is incorporated herein by reference.

GOVERNMENT SPONSORED RESEARCH

This invention was made with Government support under contract 80NSSC18C0169 awarded by the National Aeronautics and Space Administration (NASA). The Government has certain rights in the invention.

TECHNICAL FIELD

The present description relates generally to radiation shielding for space applications, and, more particularly, to a radiation shield comprised of a composite material and coating thereto.

BACKGROUND

Life on Earth is well protected from the effects of Galactic Cosmic Rays (GCRs) and secondary particles by a combination of the geomagnetic field and the atmospheric overburden. Radiation exposure to humans and sensitive equipment is significantly elevated in Low Earth Orbit (LEO), outer space, and when humans have a sustained presence on other planetary surfaces. Astronauts are typically protected by keeping their radiation exposure below the National Council on Radiation Protection (NCRP) limits by limiting their exposure time and by taking advantage of the shielding offered by the geo-magnetic field. As space exploration moves out of Earth's geo-magnetic field and beyond LEO exposure to free space cosmic radiation increases. For example, an approximately two year round trip to Mars or extended stays of up to a few months on the surface of the Moon or Mars would result in significant biological damage. Based on radiation measurements made on the Mars Science Laboratory (MSL) during the cruise to Mars, it was shown that for a human round trip to Mars the risk for cancer due to radiation exposure in space would exceed the NASA standard of 3% risk of exposure induced death.

The galactic radiation environment consists primarily of a continuous flux of Galactic Cosmic Rays (GCRs) and transient but intense fluxes of solar energetic particles (SEPs). The primary constituents of the GCR spectrum are 85% protons, 14% alpha particles, and 1% heavy nuclei with energies ranging from 10 MeV/nucleon to 10 GeV/nucleon. The intensity of these particles depends on the solar cycle as well as on the location in the inner solar system. Despite their low flux, the heavy-ions in the GCR pose a serious health risk because they are highly ionizing (energy loss is proportional to the square of the atomic number for charged particles with same velocity) and because the quality of the resulting biological damage is high. The SEPs also consist primarily of protons and alpha particles with energies ranging from a few MeV/nucleon to few 100s of MeV/nucleon. The likelihood of occurrence for these events is highest during solar maxima and their occurrences can be predicted with some degree of confidence. Although the SEP spectrum does not contain heavy ions and their energy range is much lower than that of GCRs, they still pose serious risks to humans and equipment, particularly in the event of a severe solar storm.

NASA's goal of long duration human activities on planetary surfaces such as the lunar surface mandates construction of habitat structure that will protect humans and equipment from the radiation environment. For example, unlike Earth, on the lunar surface there is neither the atmosphere nor any substantial magnetic field to provide any protection against the radiation environment. Thus, the lunar surface is always exposed to the direct bombardment of GCRs. In addition, the GCR flux generates a nuclear cascade in the lunar soil resulting in production of albedo neutrons and y rays. The neutron flux on the lunar surface can be categorized based on their energy levels as thermal (E<0.4 eV), epithermal (0.4 eV<E<1 MeV) and fast (E>1 MeV). The neutron dose is dependent on the lunar location and is a function of the soil composition at a specific location. For example, the Mare region consists mainly of basalt, rich in Fe and Ti, and has a larger cross-section for neutron production compared to the anorthositic Highland area rich in Al and Ca with a lower cross-section for neutron production. Calculations based on the Geant4 code have shown that on average the total neutron dose is approximately 23% of the total dose on the lunar surface and is dominated by the fast neutrons. Other calculations predict that up to 50% of the dose equivalent on a lunar base can come from neutrons. It has also been demonstrated that during a worst case solar particle event (SPE) an astronaut in a space suit on the lunar surface can receive an acute dose of protons and neutrons significantly in excess of the NCRP 30 day limit. The increased proton flux during a SPE also results in an increased dose of neutrons on the lunar surface. Irrespective of the habitat location, it is therefore mandatory to design habitats made from materials that will provide protection to humans not only from the GCR flux but also the neutron flux that leaks to the planetary surface from the soil.

A material based solution to the problem typically results in paying a penalty due to additional weight of the radiation shielding material. The present invention solves these problems by providing a novel radiation shield that effectively blocks solar radiation to permit extended manned space travel and longer durations of stay in space. The novel radiation shield is lighter than aluminum and is structurally sound. The present invention also provides the methods of making the novel radiation shield. The present invention develops a multifunctional composite material as an integral part of a spacecraft or habitat structure to provide shielding against GCRs and secondary particles, enhanced structural integrity, and durability against overall space environment including but not limited to atomic oxygen and UV radiation.

Electromagnetic Pulse (EMP) is an instantaneous energy field that can disrupt electrical systems and microcircuits. The more intense variety of this pulse, referred to as High-Altitude EMP (HEMP), can cause such disruptions from great distances. It is assumed that such an instantaneous burst of energy would be set off by a high altitude nuclear explosion enabled by missile flight or from a satellite. The second variety of EMP, Intentional Electromagnetic Interference (IEMI), is less intense and can be created using non-nuclear devices with powerful batteries or reactive chemicals. Although much less in intensity compared to HEMP, IEMI can be compactly packaged to introduce noise or signals into electric and electronic systems, thereby disrupting, confusing or damaging the systems for the purpose of criminal or terrorist activities. A widespread HEMP effect could lead to possible long-term disruption of the power grid, fuel distribution, transportation systems, food and water supplies, and communications and equipment for hospitals and first responders, as well as military communications systems which utilize the civilian infrastructure. NASA and US military in-space assets are also vulnerable to the effects of EMP. A large percentage of US military communications during Operation Iraqi Freedom was reportedly carried over commercial satellites, and much military administrative information is currently routed through equipment that comprises the civilian Internet. Many commercial communications satellites, particularly those in low earth orbit, reportedly will cease to function shortly after a high altitude nuclear explosion due to EMP effects.

The disruptive effects related to EMP have caused a need for shielding for military and space-based assets. The current state of the art to protect sensitive equipment and infrastructure from EMP attack is with massive shielding analogous to large, hardened enclosures or a Faraday Cage, thick concrete structures, and burying cables underground. These solutions are cost prohibitive and impractical for space assets and a multitude of terrestrial infrastructures.

The radiation shield of the present disclosure presents a new and novel solution to these problems.

BRIEF DESCRIPTION OF THE DRAWINGS

Certain features of the subject technology are set forth in the appended claims. For purposes of explanation, however, several embodiments of the subject technology are set forth in the following figures.

DETAILED DESCRIPTION

Figure 1:
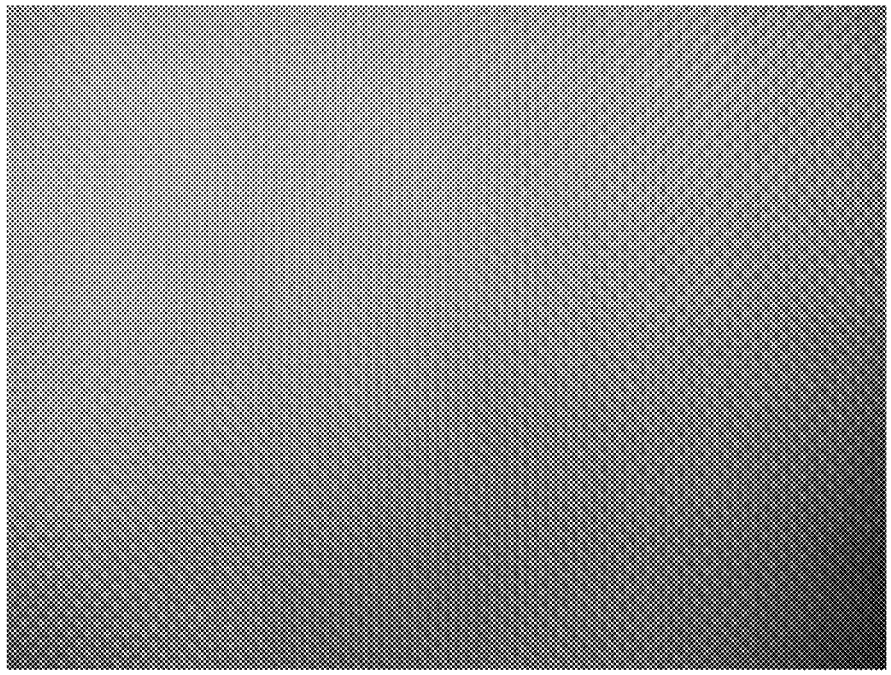
FIG. 1 shows UHMW polyethylene sheets used to make the radiation shield.
Figure 2:
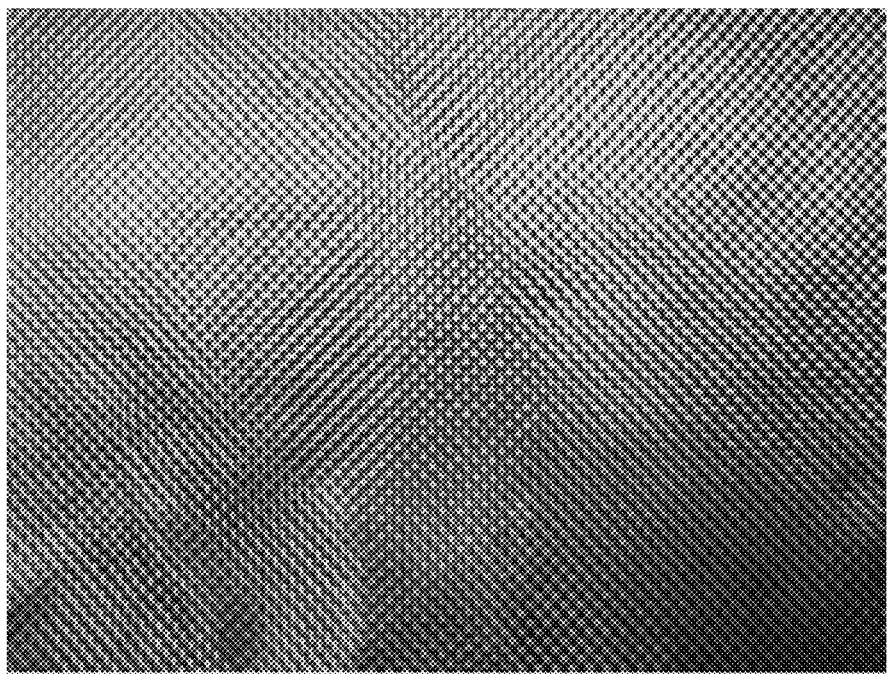
FIG. 2 shows the carbon fabric used to make the carbon layer in the radiation shield.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

Radiation shielding can perform a range of function that is determined by the layer materials used, thickness, weight, and structural supported afforded by the radiation shielding (e.g. space craft, satellites, low earth orbit vehicles, air craft, missiles, personal protection in medical and other settings where radiation is present). However, space, costs, weight, and structural requirements may limit the ability to provide maximum protection in every environment.

Given the diversity of desired applications and functions, it would be beneficial to allow a user to modify components, thicknesses, and functions of a radiation shield to customize the user experience according to the user's desires. Additionally, or alternatively, it would be beneficial to allow a manufacturer to modify components and functions of a radiation shield according to custom orders from a purchaser and/or to streamline a manufacturing process. The radiation shield, including the number and sequence of the composite layers, of the present disclosure facilitate customization, adaptability, and modification by a user according to the user's desires.

The radiation shield of the present disclosure can consist of various layers of material to provide a variety of different functions and characteristics to achieve the results that are desired by a user. The layered composite configuration allows a user to easily customize the composite stack with one or more layers of material. The sequence of the layers and the number of layers in the stack may vary to provide different functions at different times and to achieve the results desired by a user. Accordingly, a radiation shield of the present disclosure need not require the inclusion of a specific layer to provide every function that will later be desired by the user. Instead, the radiation shield, the sequence of layers, and the number of layers can be customized to achieve the results desired by a user.

The radiation shield of the present disclosure can also shield sensitive electrical systems and microcircuits from electromagnetic pulses (EMP). The radiation shield can provide shielding to entire electrical systems, cabling, or as a coating on the cabling.

The Radiation Shield

The radiation shield (100) is a stack consisting of a plurality of layers of ultra-high molecular weight (UHMW) polyethylene or high density polyethylene (110), polyethylene film (115), and carbon fiber (120). The layers of the stack are held together by epoxy or polyethylene film (125) to form a substantially rigid radiation shield (100) capable of providing structural support in its intended application. In the preferred embodiment of the invention the ultra-high molecular weight polyethylene (110) is Spectra® from Bally Ribbon Mills in Bally, Pennsylvania, U.S.A. The carbon fiber (120) layer may consist of carbon fiber fabric or carbon fiber fabric that has been coated with nanoparticles of Boron (B) or Boron Nitride (BN). In an alternative preferred embodiment the carbon fiber (120) layer is coated with Boron Oxide ($B_2O_3$) or Boron Carbide ($B_4C$).

In the preferred embodiment of the invention the radiation shield stack has a top layer of UHMW polyethylene (110a) and a bottom layer of UHMW polyethylene (110b). Preferably, a polyethylene film (120) is placed in the stack immediately adjacent to the UHWM polyethylene layer (110) to promote improved bonding between the UHMW polyethylene layer (110) and the carbon fiber layers (120).

Coating the Carbon Fiber Fabric Layers

The carbon fiber (120) layer may consist of carbon fiber fabric or carbon fiber fabric that has been coated with nanoparticles of Boron (B) or Boron Nitride (BN). In an alternative preferred embodiment the carbon fiber (120) layer is coated with Boron Oxide ($B_2O_3$), Boron Carbide ($B_4C$). A plasma treatment is used to coat the carbon fiber (120) layer with Boron (B), Boron Nitride (BN), Boron Carbide ($B_4C$) powder, or a blend of these powders. The coating of the carbon fiber (120) layer improves bonding of the epoxy or polyethylene thin file (110) with the carbon fiber (120) layer due to changes of the carbon fiber fabric (120) surface roughness, which improves wettability of the epoxy or polyethylene thin film (110) with the carbon fiber (120) layer during fabrication of the radiation shield (110).

The preferred method of coating the carbon fiber (120) layer with Boron (B), Boron Nitride (BN), Boron Oxide (BO), Boron Carbide ($B_4C$) powder, or a blend of these powders is vacuum plasma spray (VPS). The carbon fiber (120) layer may also be coated with heavy metals such as Tungsten, Tantalum, Niobium or a combination of these heavy metals or the Boron based powders. The VPS coating technique involves spraying vaporized molten or vaporized particles onto a substrate, such as the carbon fiber (120) material, for producing a coating. A primary advantage of VPS processing is its high operating temperature of greater than 10,000 K, which is sufficient for melting or vaporization of most feedstock materials. In addition, the highly reactive plasmas can be used to synthesize advanced materials and structures such as nanoparticles and nanotubes.

Figure 3:
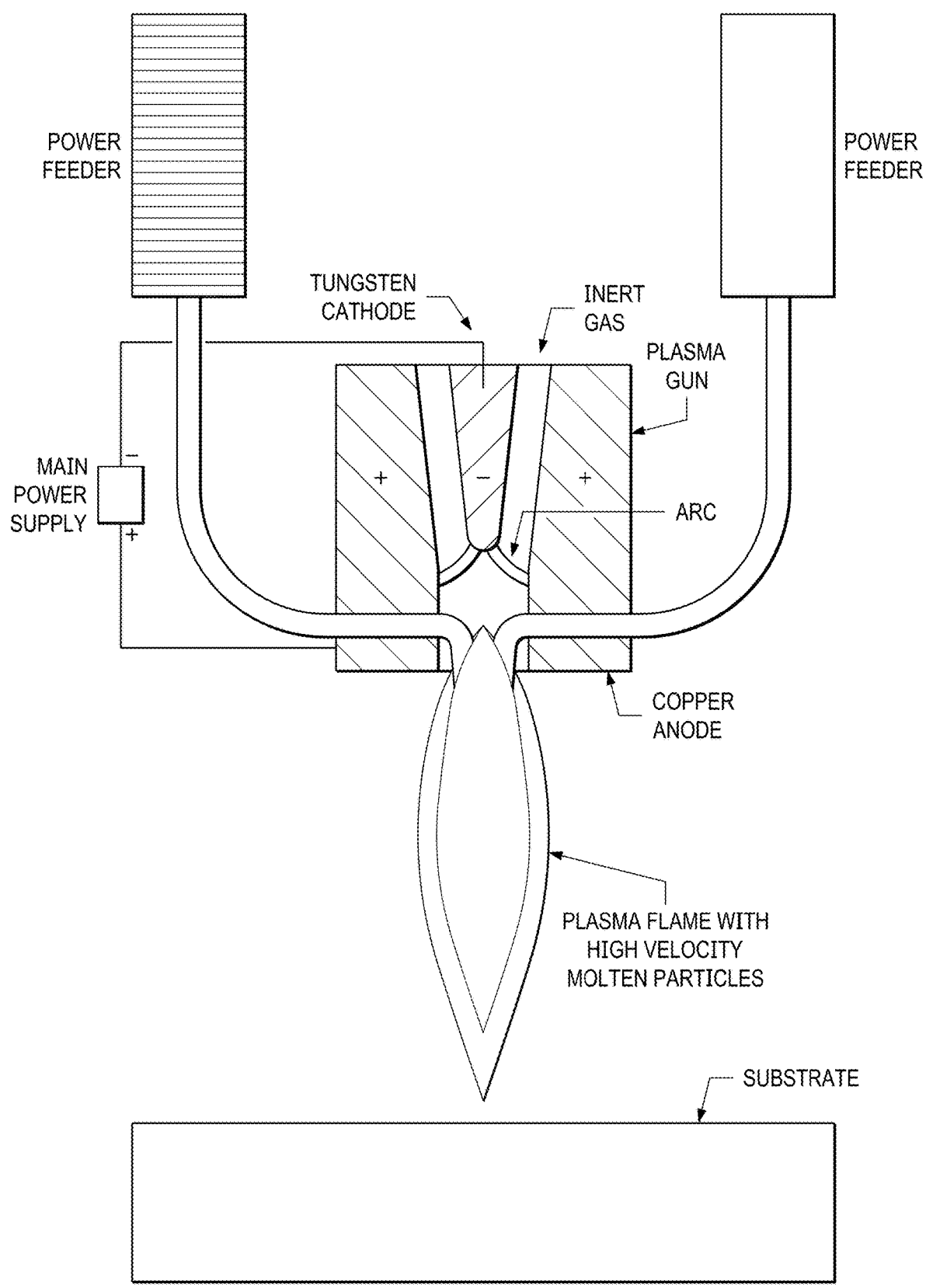
FIG. 3 is a schematic of the plasma spray process used for coating the carbon fabric with a layer of Boron, Boron Nitride (BN), Boron Oxide ($B_2O_3$), Boron Carbide ($B_4C$), or a combination thereof.
Figure 4:
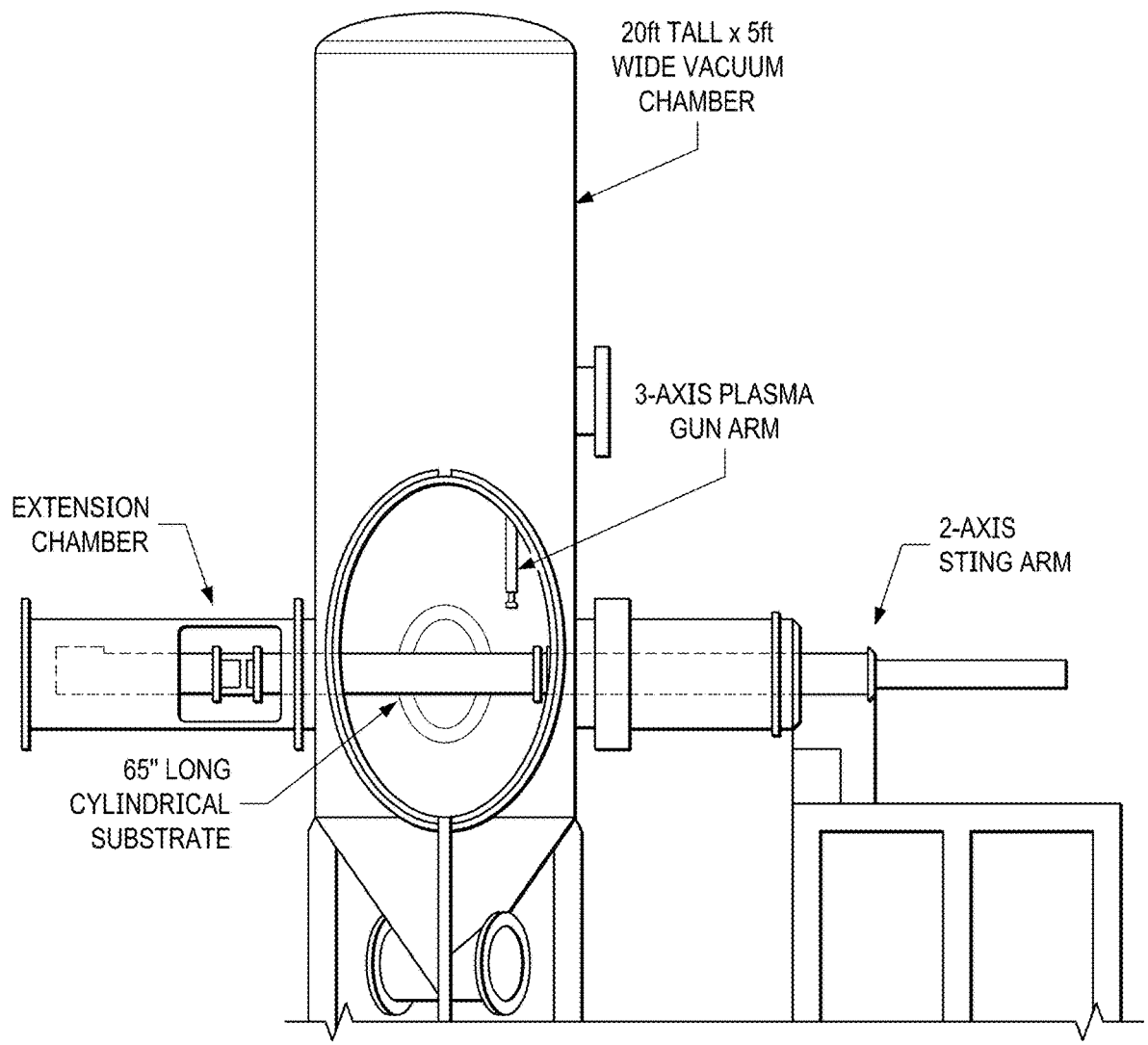
FIG. 4 is a diagram showing the vacuum plasma spray (VPS) unit.

FIG. 3 is a schematic representation of the plasma gun (200) used during the VPS process. Gases (usually Ar or $N_2$ are used as the primary gas and He, $H_2$ or $N_2$ are used at the secondary gas) are flowed between a tungsten cathode (210) and a water-cooled tungsten lined, copper anode (220). An electric arc (230) is initiated between the two electrodes (210, 220) which ionizes the gases creating a high-pressure plasma. A measured quantity of powder feedstock consisting of Boron (B), Boron Nitride (BN), Boron Carbide ($B_4C$) powder, or a blend of these powders is introduced into the gas stream either just outside the torch or in the diverging exit region of the nozzle (anode)(220). The plasma-feedstock interactions lead to melting or vaporization of the feedstock material, where it is subsequently deposited on to the carbon fiber (120) layer to produce a coating.

Figure 7:
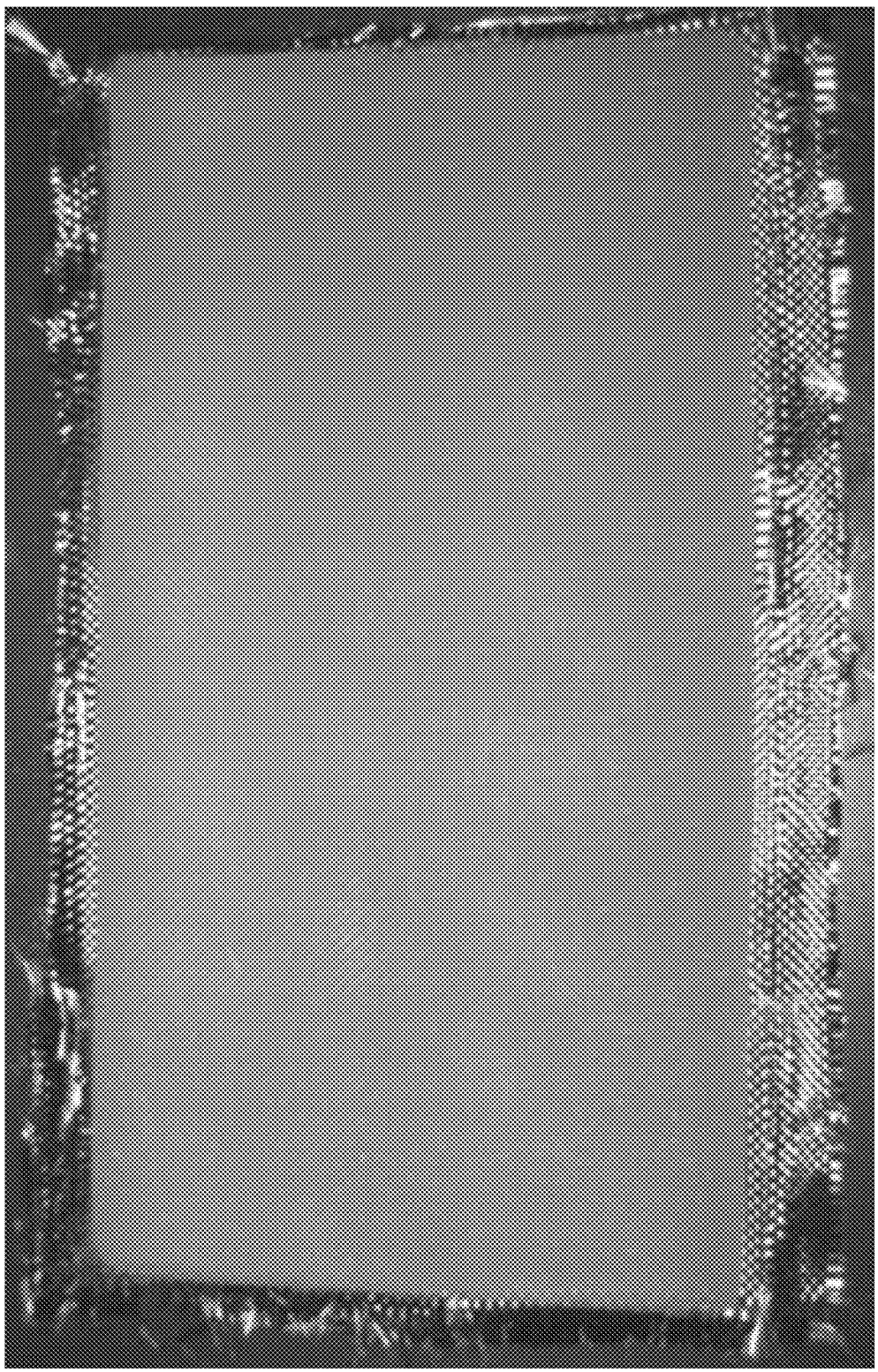
FIG. 7 shows the carbon fabric after being reactive plasma coating with Boron, Boron Nitride (BN), Boron Oxide ($B_2O_3$), Boron Carbide ($B_4C$), or a combination thereof.
Figure 8:
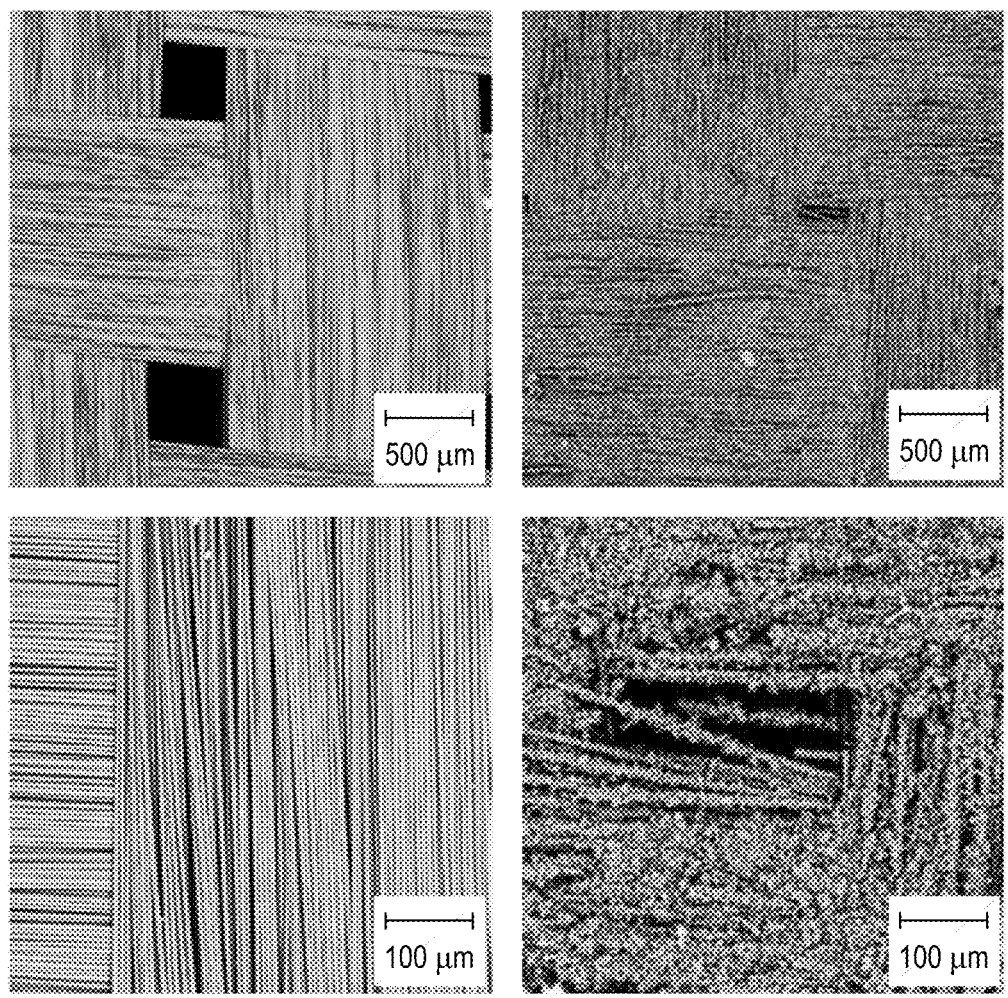
FIG. 8 a-d are SEM-BSE images of the carbon fabric before and after receiving plasma coating with BN. A) Uncoated carbon fabric, B) carbon fabric after BN coating showing uniform coverage, C) close-up view of an uncoated carbon fabric region, and D) close-up view of a BN coated region showing individual carbon fibers have been BN coated.

In one preferred embodiment Boron (B) feedstock powder is used to coat a carbon fiber (120) layer with a coating thickness ranging between 10 and 75 µm, and more preferably still ranging between 25-50 µm. In another preferred embodiment the carbon fiber (120) layer is shown after receiving a BN plasma coating in FIG. 7. FIG. 7 shows a uniform BN coating on the carbon lawyer (120) with a coating thickness ranging between 10 and 75 µm, and more preferably still ranging between 25-50 µm. FIG. 8 shows SEM-BSE images of the carbon fabric before and after coating. A comparison of the images shows complete coverage of the underlying carbon layer (120) along with an increase in surface area. This increased surface area and bonding between the BN coating and the underlying carbon layer (120) provides improved bonding between the carbon layer (120) and the epoxy (125) during fabrication of the radiation shield (100) composite.

Figure 5:
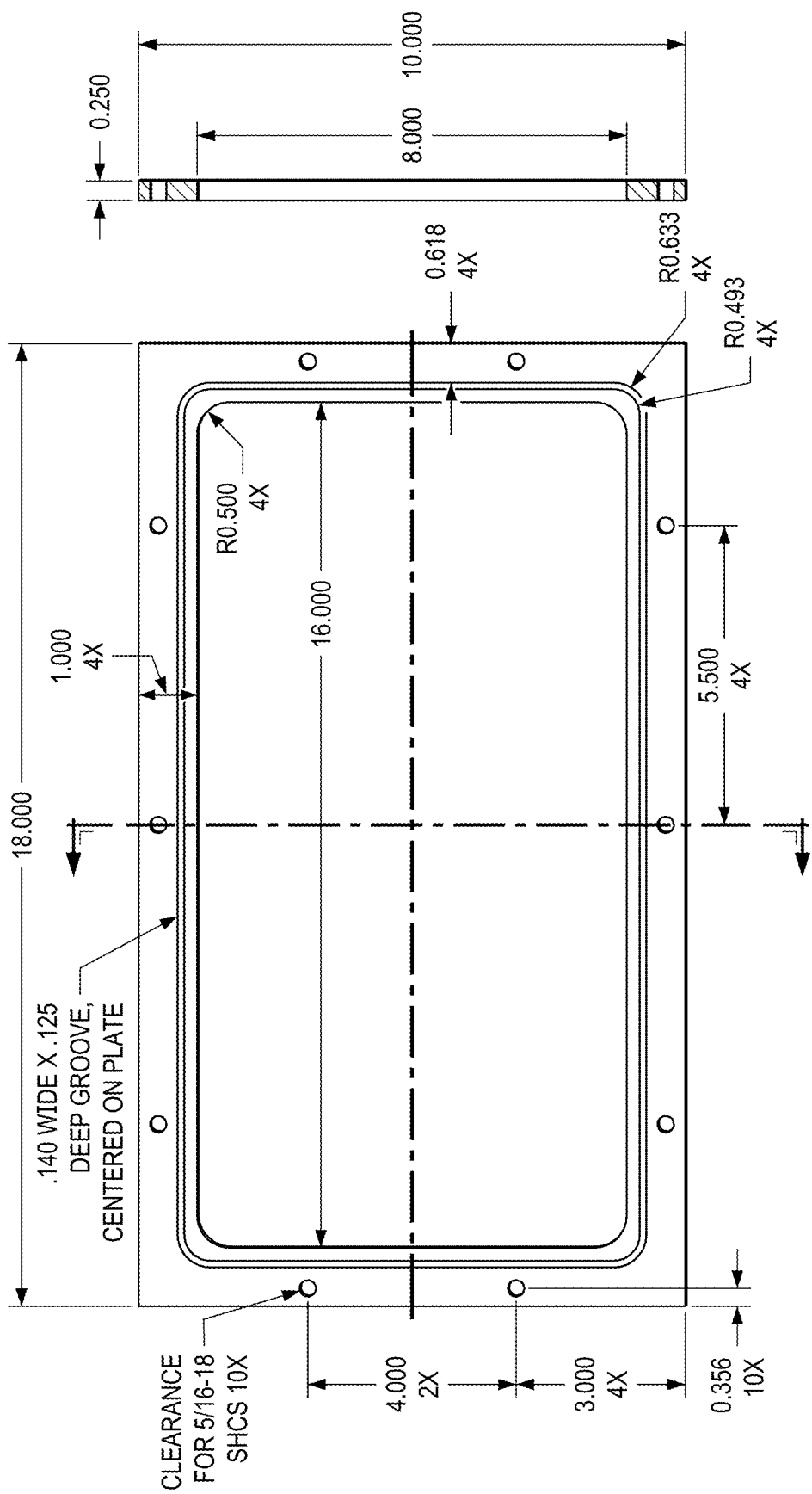
FIG. 5 is the drawing of the stainless steel assembly used to hold the carbon fabric during the plasma coating process.
Figure 6A:
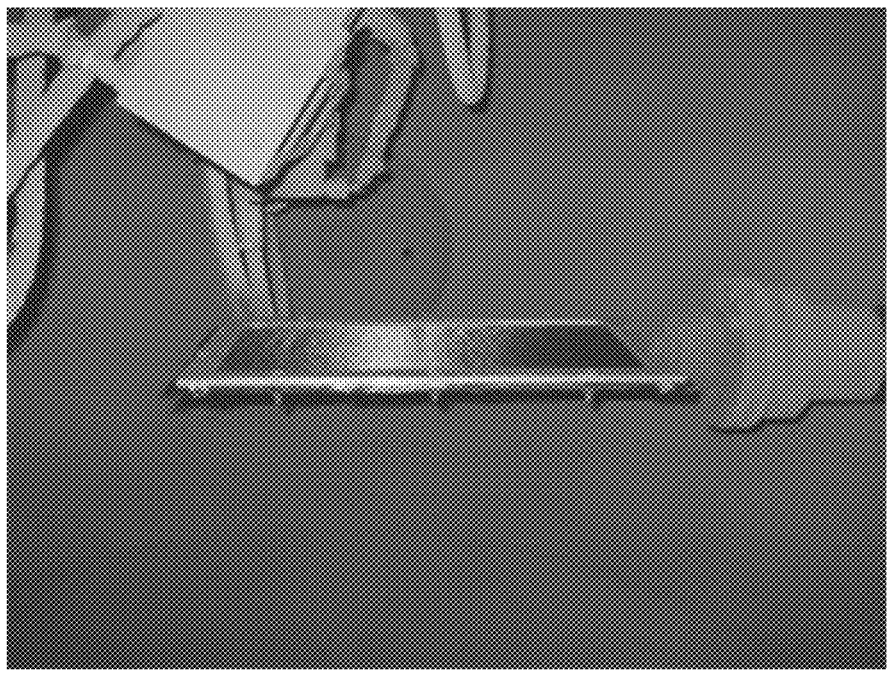
FIG. 6A is the stainless steel frame assembly holding the carbon fabric.
Figure 6B:
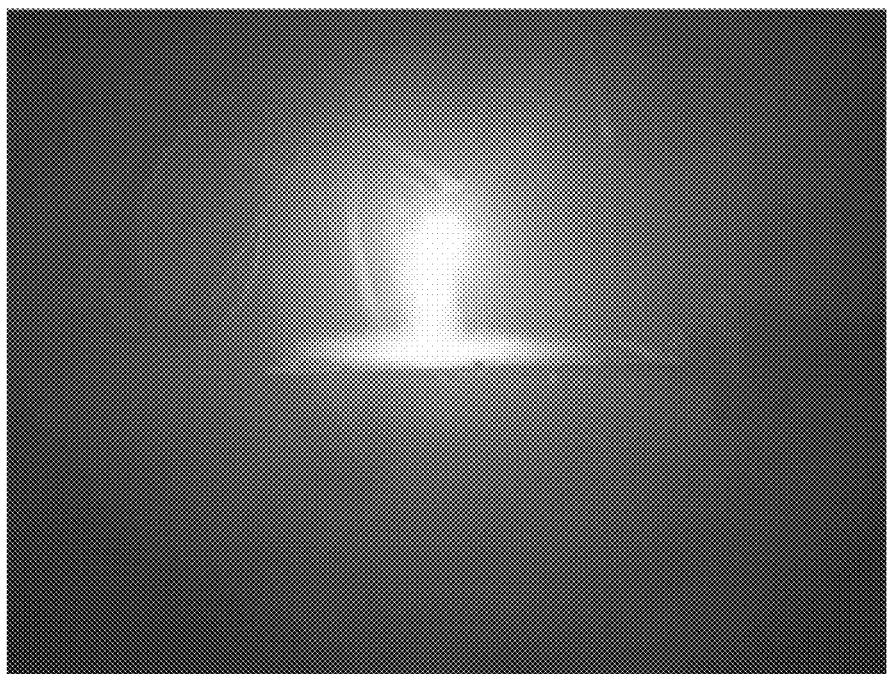
FIG. 6B is the application of Boron, Boron Nitride (BN), Boron Oxide ($B_2O_3$), Boron Carbide ($B_4C$), or a combination thereof on the carbon fabric.

A stainless steel frame assembly (300) is preferred to hold the carbon fiber (120) layer in proximity to the nozzle (210,220) during the VPS process. FIG. 5 provides a drawing of one preferred frame assembly (300). Using this frame assembly (300), an 8"×16" area of carbon fabric may coated. Large area fabrics can also be coated along with the continuous coating of fabric from reel to reel. To produce uniform coatings on the carbon layer (120), the distance between the face of the plasma gun (200) and the carbon layer (120) must be tightly controlled. To improve bonding between the coating and the carbon layer (120), the plasma gun (200) without powder being fed may be used to preheat the carbon layer (120). FIG. 6a shows a carbon layer (120) loaded in the VPS unit prior to coating and FIG. 6b shows a carbon layer (120) during VPS receiving a BN plasma coating.

The advantages of the VPS process for producing the boron-based materials on the carbon fiber (120) layer include: the high temperature plasma enables the processing of high melting temperature materials such as carbides and nitrides to coat the carbon fiber (120) layer; the synthesis of non-congruently melting materials such as BN; manipulation of the density and chemistry of a deposit by varying the process parameters; high processing temperatures and rapid cooling rate allow the retention of fine grained microstructures as well as the fabrication of nano-particles/structures; and high deposition rate (cm/hr).

Anticipated Uses

The present invention is directed to structural radiation shielding for the protection of humans and electronics in aerospace transportation vehicles, space transportation vehicles, large space structures, such as space stations, orbiters, landing vehicles, rovers, habitats and nuclear propulsion. One of ordinary skill in the art would recognize that the present invention may be used in other commercial applications such as providing radiation shielding for particle accelerators, nuclear reactors, radioactive waste containment, satellite hardware, high-altitude airliners, and medical patient shielding. The present invention may also be utilized to provide electromagnetic pulse protection, protection for sensors for neutron detection, and in the field of advanced nanoscale ceramic particles and tubes for composite reinforcement. One of ordinary skill in the art would understand that the number and sequence of layers of the stack consisting of (UHMW) polyethylene (110), a polyethylene film (120), and a carbon fiber (120) layer would have to be adjusted for each such application.

Manufacturing the Radiation Shield

The radiation shield (100) is a stack consisting of a plurality of layers of ultra-high molecular weight (UHMW) polyethylene (110), polyethylene film (115), and carbon fiber (120). The layers of the stack are held together by epoxy to form a substantially rigid radiation shield capable of providing structural support in its intended application. In the preferred embodiment of the invention the ultra-high molecular weight polyethylene is Spectra® from Bally Ribbon Mills in Bally, Pennsylvania, U.S.A. The carbon fiber (120) layer may consist of carbon fiber fabric or carbon fiber fabric that has been coated with nanoparticles of Boron (B) or Boron Nitride (BN). In an alternative preferred embodiment the carbon fiber (120) layer is coated with Boron Oxide ($B_2O_3$), Boron Carbide ($B_4C$).

Figure 9:
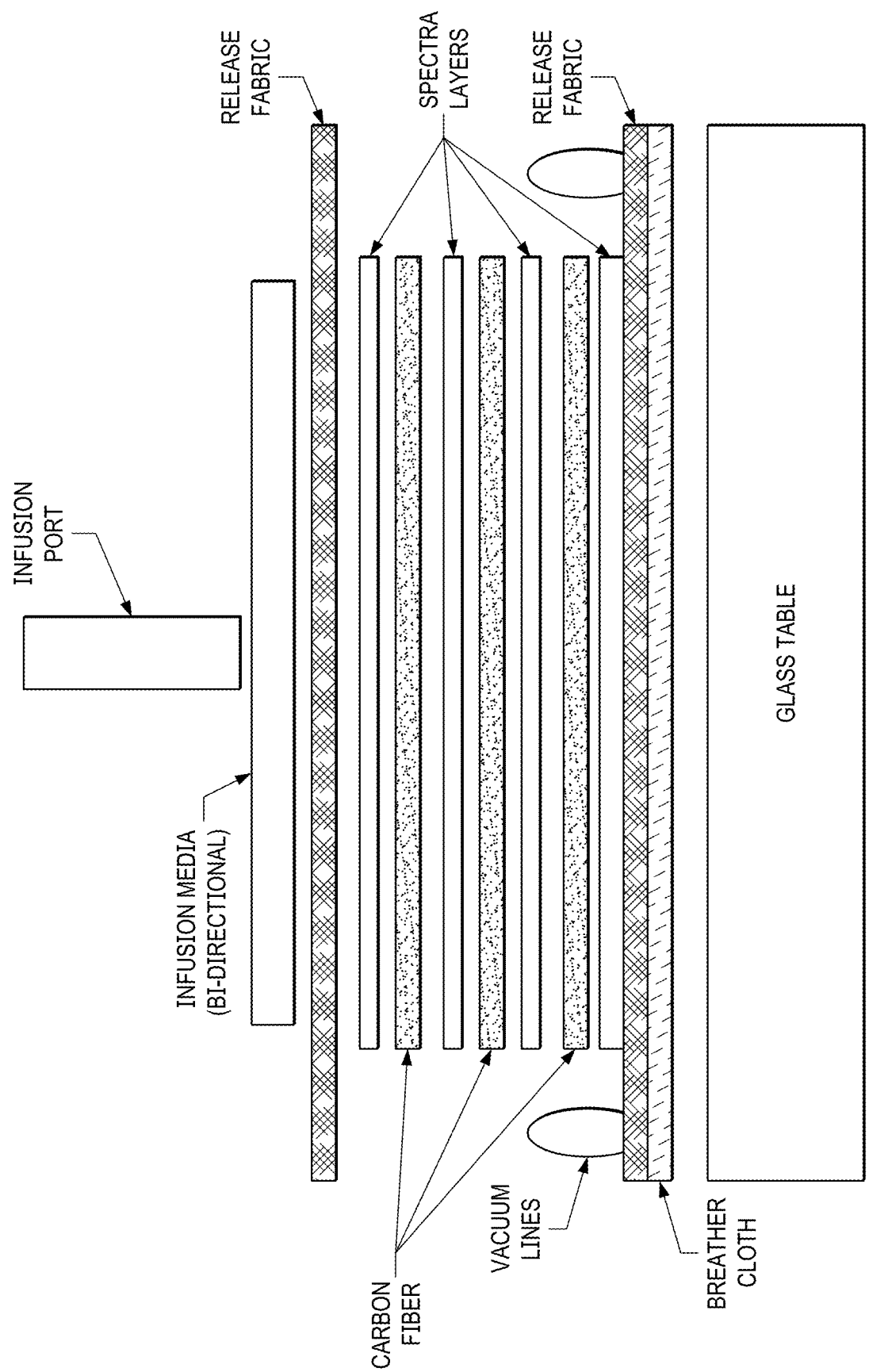
FIG. 9 is a schematic representation of the vacuum assisted resin transfer molding (VARTM) process.
Figure 10:
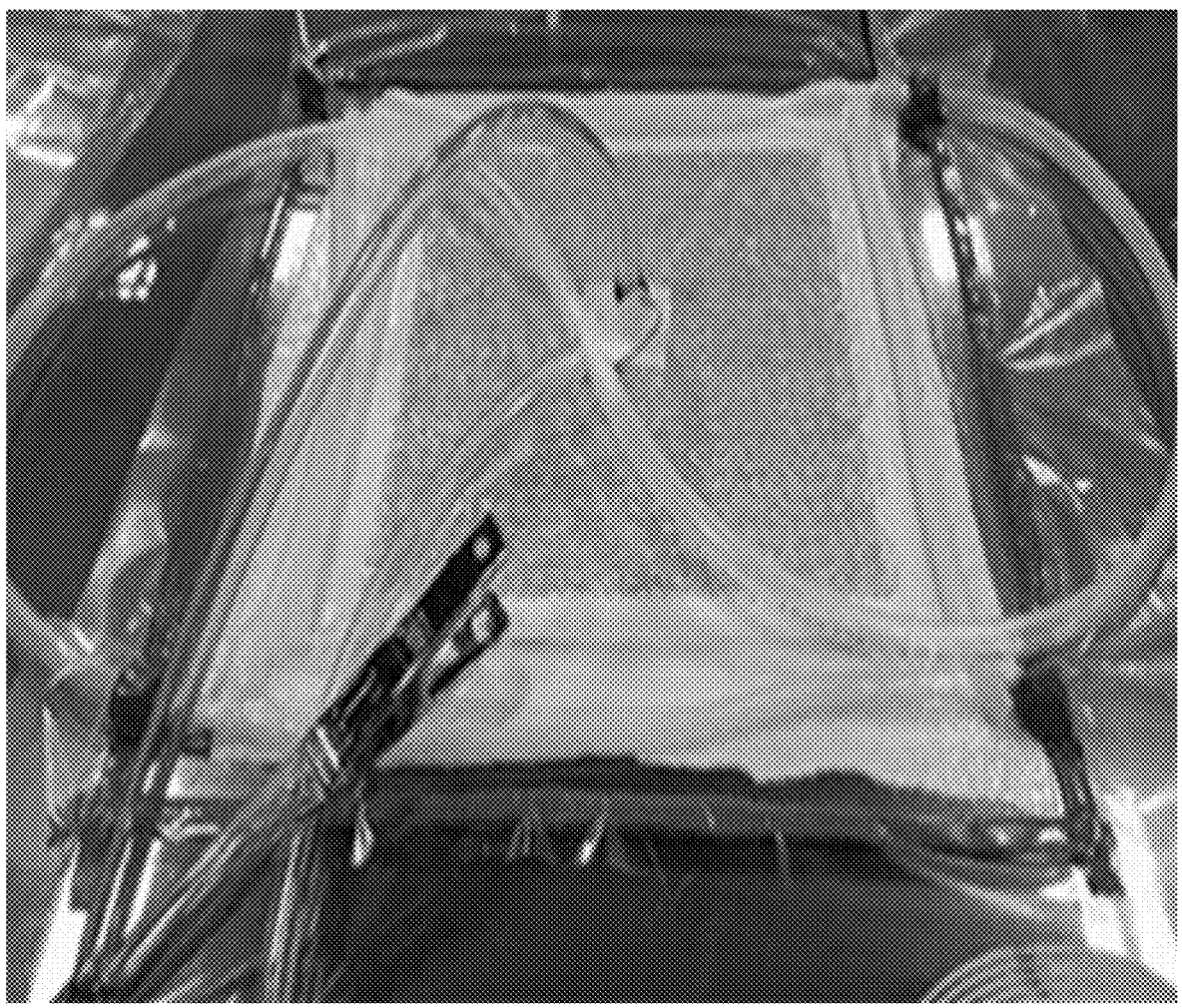
FIG. 10 is a setup for the vacuum assisted resin transfer molding (VARTM) process.
Figure 11:
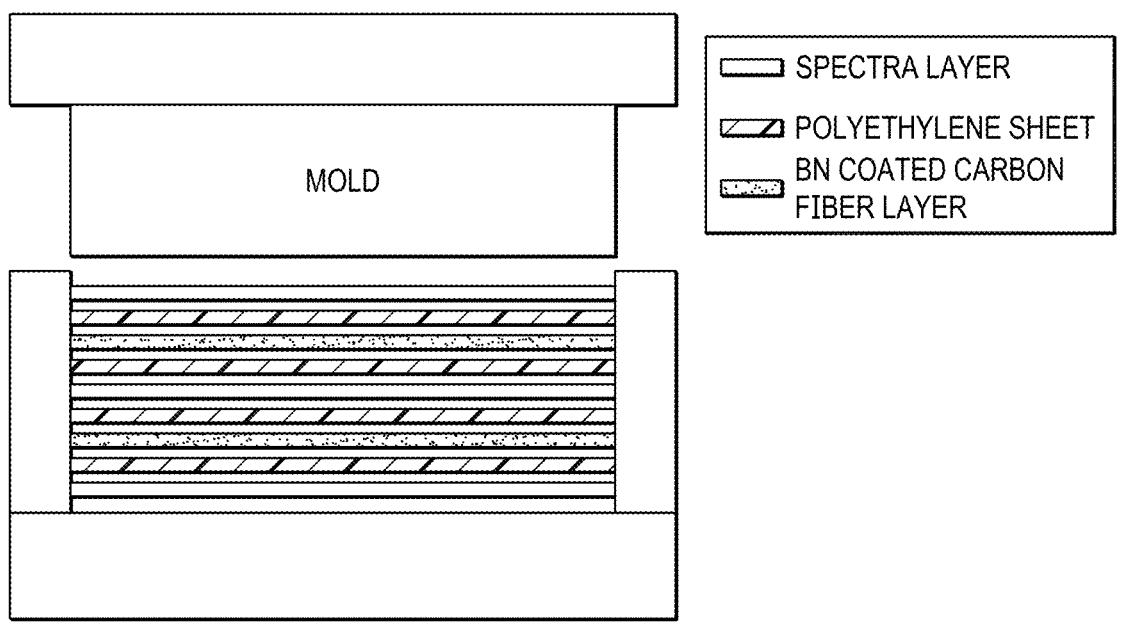
FIG. 11 is a possible setup sequence showing the layers of UHMW polyethylene, polyethylene sheet, and carbon fiber fabric coated with BN.
Figure 12:
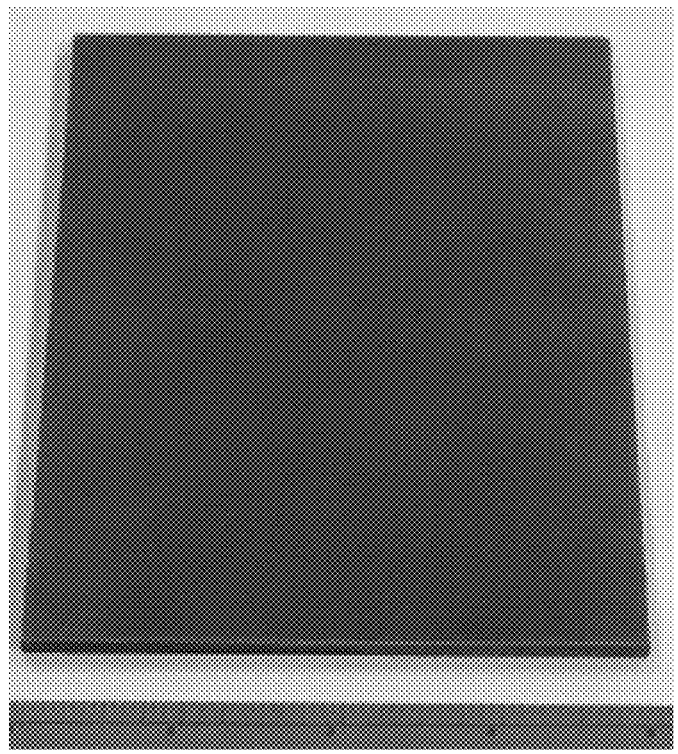
FIG. 12 shows a radiation shield panel produced by the vacuum assisted resin transfer molding (VARTM) process.

The preferred manufacturing method of the radiation shield (100) is a vacuum assisted resin transfer molding (VARTM) procedure. FIG. 9 shows the layup procedure for a radiation shield (100) panel consisting of placing a piece of breather cloth down as the bottom layer of the layup to provide good evacuation throughout the plate, followed by a layer of release fabric, followed by reinforcement. A non-limiting representative sequence of layers are: 4 layers UHMW polyethylene, 1 BN coated carbon layer, 4 layers UHMW polyethylene, 1 BN coated carbon layer, 4 layers UHMW polyethylene, 1 BN coated carbon layer, and finally 4 layers of UHMW polyethylene. The top of the panel stack then has a second layer of release fabric, followed by two layers of infusion.

Following VARTM manufacturing procedures the panel stack is infused from the top center. Vacuum lines are placed around the periphery of the panel to ensure that the vacuum pressure is held throughout the panel. The layup is then bagged and evacuated. Evacuation may be applied for 1 hour to remove excess air from the panel stack before infusion occurs. The panel stack is then infused with one or more of the following: epoxy resin, polyethylene (UHMWPE), low density polyethylene (LDPE), high-density polyethylene (HDPE).

For example the VARTM method was used to fabricate a ⅛" thick composite. For that thickness 12 pieces of UHMW polyethylene and 3 pieces of C fabric coated with BN were utilized. Taking into account the thickness of the BN coating the composition of the proposed composite in weight percentage was estimated to be 43.7% $CH_2$, 27.8% C, 21.8% Epoxy, and 6.7% BN with an elemental composition of $C_{6.47}H_{7.49}Cl_{0.05}O_{0.25}B_{0.26}N_{0.26}$.

Figure 13:
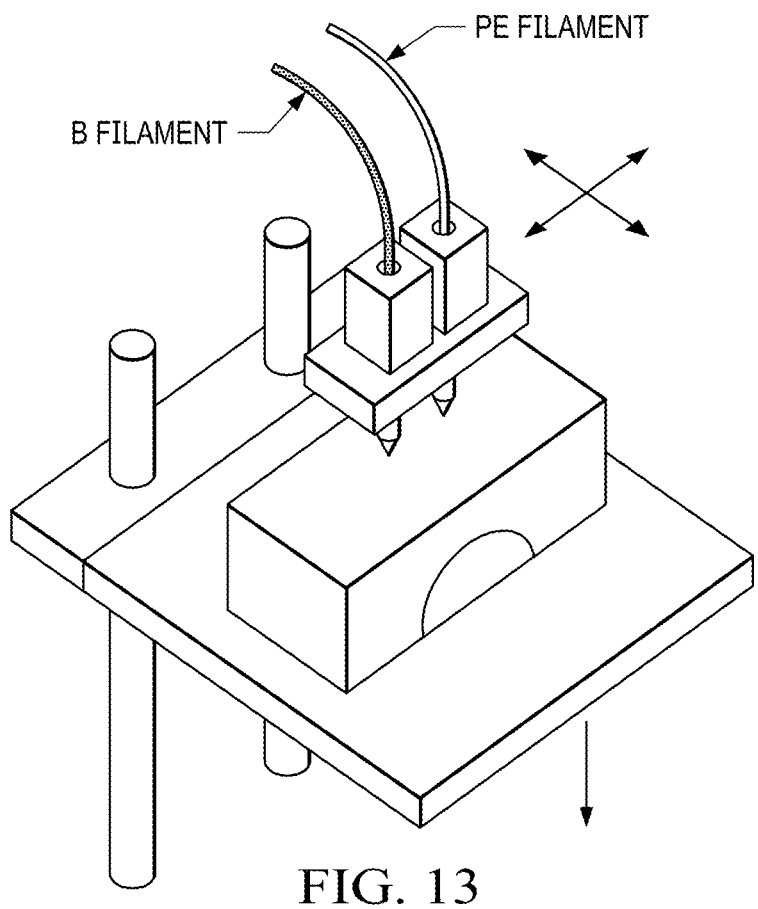
FIG. 13 shows the additive manufacturing method for making the radiation shield.

In an alternative preferred manufacturing method additive manufacturing may be used to make the radiation shield (100). Additive manufacturing allows for the creation of intricately shaped materials and materials of varying thicknesses. FIG. 13 shows an additive manufacturing printer with a polyethylene filament and a Boron filament where the additive manufacturing process is used to make the radiation shield (100). Various filaments may be used to manufacture a radiation shield (100) to meet a user's requirements. The filaments may include epoxy resin, polyethylene (UHMWPE), low density polyethylene (LDPE), high-density polyethylene (HDPE), Boron (B), Boron Nitride (BN), Boron Oxide ($B_2O_3$), Boron Carbide ($B_4C$) and blends thereof.

Test Results

Figure 14:
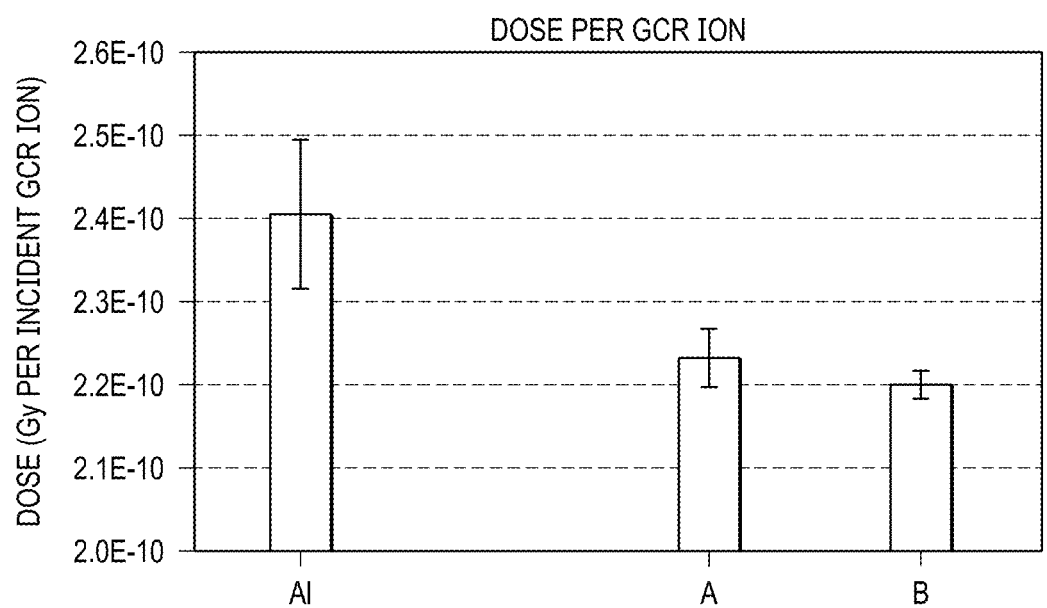
FIG. 14 shows simulation results for a dose (in Gy per GCR ion) behind 20 g/cm² of an aluminum reference sample compared to the composite radiation shield (100) as a Sample "A" using boron coating as the neutron absorbing material and a radiation shield (100) as a Sample "B" using boron coating as the neutron absorbing material and polyethylene thin films as a binder in place of epoxy. Error bars show the statistical uncertainties for each calculations.

The effectiveness of the radiation shield (100) to block GCR ions compared to Aluminum using radiation transport calculations. The simulation results shown in FIG. 14 compares a radiation shield made pursuant to the current invention identified as Sample A uses boron nitride as the neutron absorbing material and epoxy as the binder material, and Sample B uses boron nitride as the neutron absorbing material and polyethylene thin film as the binder. Aluminum was used as a benchmark because it is the current state of the art for spacecraft structures and avionics boxes. The simulations were run under the worst-case conditions of solar minimum (maximum GCR flux), with GCR ions spanning the range between protons (hydrogen) and iron, and for energies up to 10 GeV per nucleon. FIG. 14 shows the results of a calculated dose per GCR ion behind 20 g/cm² of shielding material. Materials "A" and "B" perform well compared to aluminum (with an approximate 10% drop in dose).

Radiation shield (100), as reflected by samples A and B in the simulation, demonstrate advantages of subject invention composite due to the high hydrogen content of the material and the addition of boron based materials, both of which reduce the contribution of the dose from neutrons created by GCR interactions in shielding.

Test were performed to demonstrate effective shielding against neutrons using radiation shield (100) sample B and a Plutonium-Beryllium (PuBe) neutron source. Table 1 shows the experimentally measured total dose attenuation as a function composite areal density or thickness. For example, 36% of the dose for neutron energies between 2 and 10 MeV were attenuated for an areal density of 5.2 g/cm². At an areal density of 18.2 g/cm², the total dose attenuation increased to 62%.

TABLE 1

Total dose attenuation for all deposited energies above 2 MeV at the given shielding thicknesses for composite B.

| Composite areal density | Total dose attenuation |
| --- | --- |
| 5.2 g/cm² | 0.36 |
| 10.4 g/cm² | 0.53 |
| 15.5 g/cm² | 0.60 |
| 18.2 g/cm² | 0.62 |

Electromagnetic Pulses (EMP) is an instantaneous energy field set off by a high altitude nuclear explosion enabled by missile flight or from a satellite. In addition, x-rays and gamma rays are other components of the EMP spectrum. A widespread EMP effect would lead to long-term disruption of the nation's critical communication, transportation, and military infrastructure. NASA and US military in-space assets are also vulnerable to the effects of EMP. The current state of the art to protect against an EMP attack is the deployment of massive shielding such as a Faraday Cage, concrete structures, and buried cables.

The radiation shield (100), with one or more EMP resistant coatings of high-atomic number (Z) can shield advanced avionics in NASA and US military space assets ranging from satellites to space transportation systems. The thickness needed for EMP resistant coatings with a high atomic number (Z) coating to reduce x-ray flux to ¹⁄₁₀₀ of its incident value for typical x-ray energies between 10-20 keV were calculated. These results are shown in Table 2. For the highest x-ray energy of 20 KeV, only a coating thickness of 41 micron would suffice to reduce the dose by a factor of 100.

TABLE 2

Thicknesses needed to reduce x-ray fluences at the given energies to 1/100 of their incident fluence.

| Energy (keV) | Coating Thickness (microns) |
| --- | --- |
| 10 | 29 |
| 11 | 13 |
| 12 | 12 |
| 13 | 13 |
| 14 | 15 |
| 15 | 18 |
| 16 | 22 |
| 17 | 25 |
| 18 | 30 |
| 19 | 35 |
| 20 | 41 |

Closing

Accordingly, embodiments of the present disclosure provide a radiation shield that provide a variety of different components and functions to achieve the results that are desired by a user. The configurations allow a user to easily customize the radiation shield with one or more functional configurations of the composite layers or coatings provided to obtain the desired features. Accordingly, a radiation shield of the present disclosure need not include a specific number of layers in a specific sequence. Instead, the radiation shield can have any number of layers or coatings as customizable by the use to achieve the desired results.

A reference to an element in the singular is not intended to mean one and only one unless specifically so stated, but rather one or more. For example, "a" layer may refer to one or more layers. An element proceeded by "a," "an,", "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or action.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single product or multiple products. Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), unless the element is expressly recited using the phrase "means for" or, in the case of a method claim, the element is recited using the phrase "step for".

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language of the claims and to encompass all legal equivalents. Notwithstanding, none of the claims are intended to embrace subject matter that fails to satisfy the requirements of the applicable patent law, nor should they be interpreted in such a way.

We claim:

1. A radiation shield laminate for blocking radiation comprising:
   A plurality of layers of polyethylene;
   One or more layers of carbon fabric, wherein one or more of the layers of the carbon fabric has a coating between 25 to 50 μm thick, where the coating is selected from a group consisting of Boron, Boron Nitride, and Boron Carbide; and,
   Wherein the plurality of layers of polyethylene and the one or more layers of carbon fabric are adhered together by epoxy.

2. A radiation shield laminate for blocking radiation according to claim 1 wherein the one or more layers of carbon fabric are coated with Boron.

3. A radiation shield laminate for blocking radiation according to claim 1 wherein the one or more layers of carbon fabric are coated with Boron Nitride.

4. A radiation shield laminate for blocking radiation according to claim 1 wherein the one or more layers of carbon fabric are coated with Boron Oxide.

5. A radiation shield laminate for blocking radiation according to claim 1 wherein the one or more layers of carbon fabric are coated with Boron Carbide.

6. A radiation shield laminate for blocking radiation according to claim 1 wherein at least one of the one or more layers of carbon fabric is coated with a mixture of Boron, Boron Nitride, Boron Oxide or Boron Carbide.

7. The radiation shield laminate of claim 1 wherein the polyethylene is ultra-high molecular weight polyethylene.

8. A radiation shield laminate stack comprising:
   A first layer of polyethylene on a top side of the laminate stack;
   One or more layers of carbon fabric with a Boron based coating, wherein the coating is between 25 to 50 μm thick; and;
   A second layer of polyethylene on a bottom side of the laminate stack;
   Wherein an epoxy adheres the one or more layers of carbon fabric between the first layer of polyethylene and the second layer of polyethylene.

9. The radiation shield laminate stack of claim 8 wherein one or more layers of carbon fabric have a coating selected from the group consisting of Boron, Boron Nitride, Boron Oxide, or Boron Carbide.

10. A radiation shield laminate stack according to claim 8 further comprising a plurality of polyethylene layers between the first layer of polyethylene and the second layer of polyethylene.

11. The radiation shield laminate of claim 8 wherein the polyethylene is ultra-high molecular weight polyethylene.

12. A radiation shield laminate stack comprising:
   A first layer of polyethylene on a top side of the laminate stack;
   One or more layers of carbon fabric, wherein the carbon fabric has a Boron based coating with a thickness between 25 to 50 μm; and;
   A second layer of polyethylene on a bottom side of the laminate stack.

13. A radiation shield laminate stack of claim 12 wherein an epoxy adheres the one or more layers of carbon fabric between the first layer of polyethylene and the second layer of polyethylene.

14. A radiation shield laminate stack of claim 12 wherein the coating on the carbon fabric is a Boron Nitride coating.

15. A radiation shield laminate stack of claim 12 wherein the coating on the carbon fabric is a Boron Carbide coating.

16. A radiation shield laminate stack of claim 12 wherein the coating on the carbon fabric is a Boron Oxide coating.

17. The radiation shield laminate of claim 12 wherein the polyethylene is ultra-high molecular weight polyethylene.

18. A radiation shield laminate stack according to claim 12 further comprising a plurality of polyethylene layers between the first layer of polyethylene and the second layer of polyethylene.

* * * * *